Jan. 21, 1958  R. P. GARRISON ET AL  2,820,641
GEAR CHUCK
Filed July 19, 1956  2 Sheets-Sheet 1
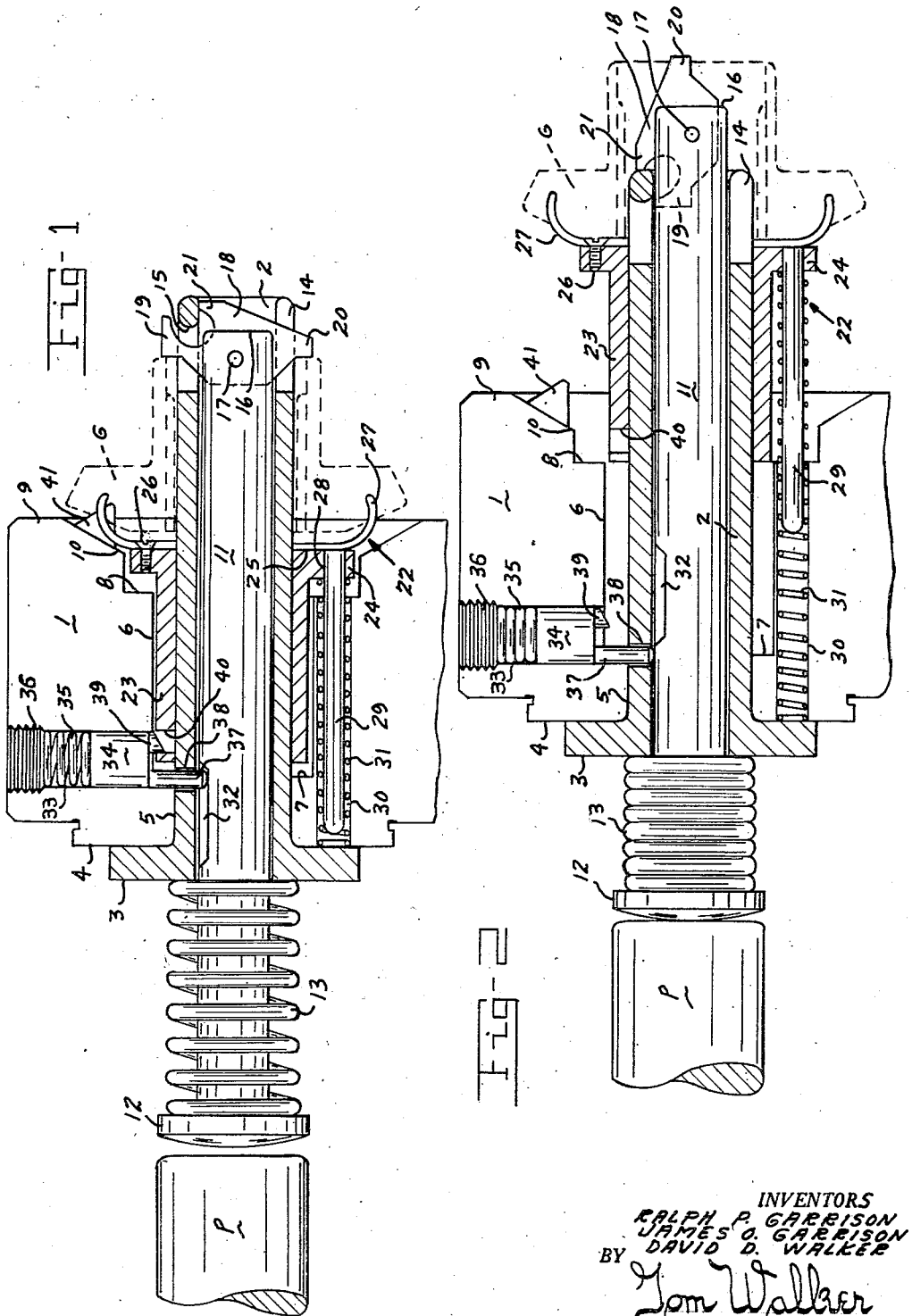
INVENTORS
RALPH P. GARRISON
JAMES O. GARRISON
DAVID D. WALKER
BY
Tom Walker
ATTORNEY

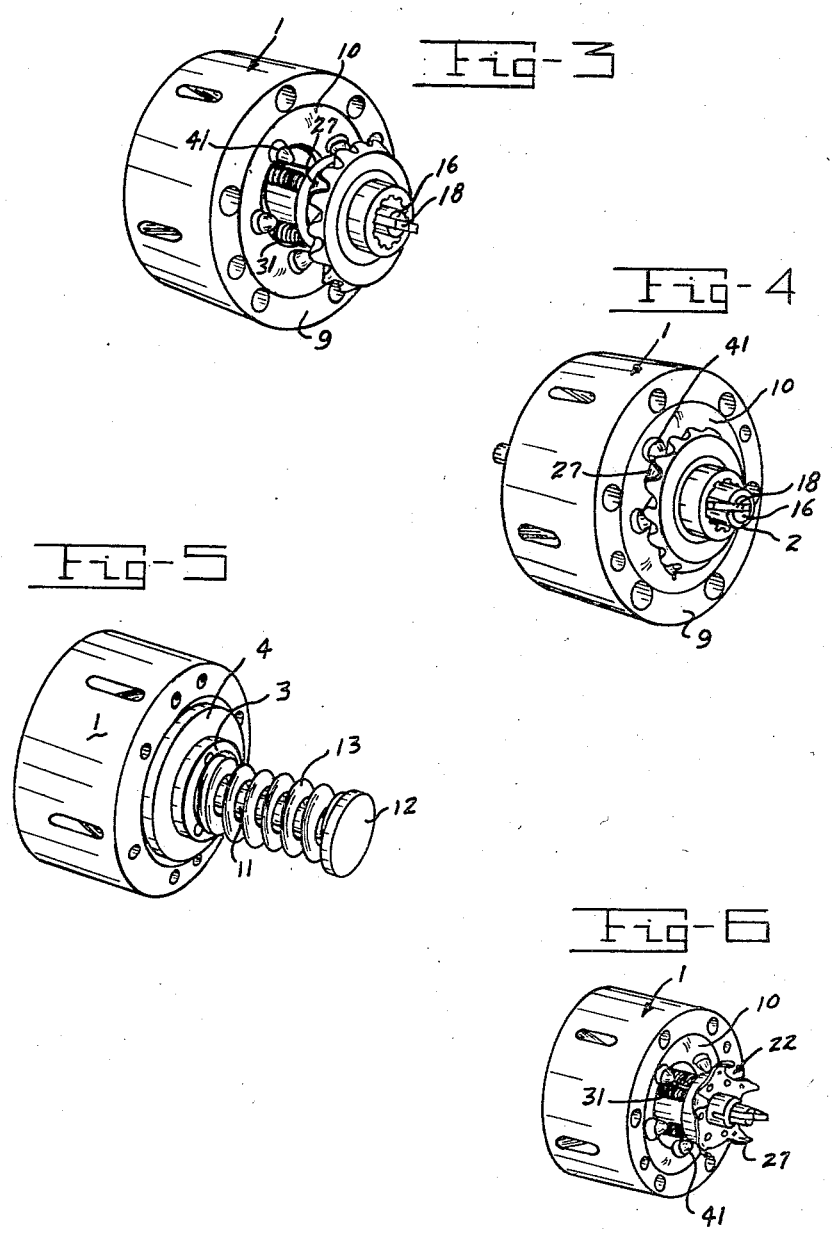

United States Patent Office 2,820,641
Patented Jan. 21, 1958

2,820,641

GEAR CHUCK

Ralph P. Garrison, James O. Garrison, and David D. Walker, Dayton, Ohio, assignors to Garrison Machine Works, Inc., Dayton, Ohio, a corporation of Ohio Application July 19, 1956, Serial No. 598,962

12 Claims. (Cl. 279—106)

The invention relates to chucks and more particularly to automatic draw bar operated chucks of an improved nature.

This field has been the subject of considerable development activity. The accuracy and efficiency of the chuck and the chucking operation is of considerable importance in manufacturing facilities, particularly in high production activity, since it directly affects product cost and quality. Prior art chucks have indicated a definite need for improvement thereof to provide a more accurate and a more positive and effective chucking action. Inaccuracies in chucks and impositive chucking afforded by them have necessitated undesirable reworking of the part. This results in additional chucking to finish the work and a general increase in the time and effort required to effect a quality product. The increased costs involved are believed obvious.

The present invention was developed to simplify and improve the chucking operation so as to increase production efficiency and product quality. It provides an improved chuck affording a positive and continuously accurate, automatic chucking action. An accurate product results in a minimum of time and at a minimum cost. While the invention embodiment illustrated herein is directed in particular application to gear chucks, it will be readily obvious therefrom that the chuck may be simply adapted to handle other items. The chuck presented is proposed for use with an automatic loader. It is draw bar operated to eject a finished item, receive another item for precise location thereof and automatically lock the item in predetermined position for working thereof with maximum precision. This chucking operation is effected in one simple quick reciprocating movement of the draw bar.

The object of the invention is to simplify the construction as well as the means and mode of operation of chucks whereby such chucks may not only be economically manufactured, but will be more efficient and satisfactory in use, adaptable to a wide variety of applications, and be unlikely to get out of repair.

A further object of the invention is to provide an improved chuck of an automatic nature which is particularly applicable as a gear chuck.

Another object of the invention is to provide an improved chuck of an automatic nature for use with an automatic loader affording means to eject a finished part, receive a part to be worked and precisely locate it relative thereto in identical fashion each time, and automatically lock the part thereto for assured precision working thereof.

An additional object of the invention is to provide an improved draw bar operated chuck providing means for automatic precision chucking of work delivered thereto in a quick positive manner.

A further object of the invention is to provide a chuck possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a cross-sectional view of a chuck in accordance with the invention showing a gear locked thereto for working thereof;

Fig. 2 is a view similar to that of Fig. 1, but showing the finished gear in process of being ejected from the chuck;

Fig. 3 is a perspective view of the chuck of Fig. 1 showing a gear being received by the chuck;

Fig. 4 is a perspective view of the chuck of Fig. 1 showing a gear in locked position in the chuck, Fig. 5 is a rear perspective view of the chuck assembly of Fig. 1;

Fig. 6 is a view of the chuck assembly similar to that shown in Fig. 3 but with the gear removed to show details of the chuck assembly in perspective.

Like parts are indicated by similar characters of reference throughout the several views.

The invention can best be described with reference to the practical embodiment thereof illustrated in the drawings. A chuck housing 1 is provided which is axially apertured to provide it with a stepped internal surface affording a minimum internal diameter to the housing in the section 5 adjacent the rear face 4 thereof. A bushing 2 in the form of an elongated cylinder is mounted in the housing 1 so as to have the ends thereof extending rearwardly and forwardly from the housing. An external flange 3 is provided on the rear extremity of the bushing 2 and is engaged in abutting relation to the rear face 4 of the chuck housing. The bushing 2 seats in press fit relation to the housing at the rear section 5 thereof providing its minimum internal diameter. The internal diameter of the housing is expanded at a central section 6 thereof providing a shoulder 7 internally of the housing 1 which faces forwardly thereof. Adjacent to and spaced from the forward face 9 of the chuck housing, the internal diameter is further expanded to provide a second shoulder 8 therein which also faces forwardly of the housing. At the forward face 9 thereof, the internal diameter of the housing 1 is expanded in conical fashion at 10.

A draw bar 11 is slidably mounted within the bushing 2. The draw bar 11 has an enlarged head 12 at the rear end thereof which is normally maintained in a predetermined spaced relation to the rear face 4 of the housing by a coil spring 13 interposed between the head 12 and the flange 3 of the bushing 2.

The bushing 2 is provided with a slot 14 in the undersurface thereof at its forward extremity. Diametrically opposed to the slot 14 and spaced inwardly of the forward extremity thereof, the bushing 2 is provided with an aperture 15 therein. The forward end 16 of the draw bar 11 is bifurcated and provided with a pin 17 transversely connecting the spaced portions thereof. A clamping finger 18 is pivotally mounted on the pin 17 within the bifurcation in the bar 11. With the bar 11 in its normal position biased rearwardly in the housing 1, the finger 18 is disposed within the slot 14 and the aperture 15 in the bushing 2. As so positioned hook extension 19 thereon projects through the aperture 15 and a projection 20 on the opposite side of the finger projects through the slot 14. This position of the finger 18 is shown in Fig. 1 of the drawings to effect a locking of a gear to the chuck housing as will be described. As will be noted therein, the finger also has a projection 21 forwardly thereof in this locking position which engages the inner surface of the bushing to insure the maintenance of the finger in this position until the draw bar is moved axially to displace it.

A shedder mechanism 22 is mounted about the bushing 2 forwardly thereof. This mechanism consists of a cylindrical hub section 23 provided with an external flange 24 at the forward extremity thereof. To the forward face of the flange 24 is fixed a shedder plate 25 by screws 26. Spaced about the perimeter of the shedder plate are curved forwardly projecting prongs 27 of a triangular nature. These prongs 27 have an identical configuration. Apertures 28 are provided in the flange 24. Guide rods 29 fixed to the shedder plate 25 extend back through these apertures 28 into apertures 30 in the chuck housing through the shoulder 8 therein. Coil springs 31 seat in these apertures 30 about the guide rods 29 to abut the flange 3 of the bushing 2 at one end thereof and the flange 24 of the shedder mechanism at the other end thereof to normally bias the shedder mechanism outwardly from the chuck housing.

A longitudinal groove 32 is provided in the draw bar 5 normally disposed to the rear of the housing 1 within the bushing 2. An aperture 33, threaded at its outer end, extends laterally through the housing 1 to the rear thereof. A trigger element 34 of a generally cylindrical nature slidably mounts in the aperture 33 at the inner end thereof. A coil spring 35 seats over the trigger 34 in the aperture and an externally threaded plug 36 seals the outer end of the aperture 33 to apply a bias to the trigger 34 through spring 35. To the inner surface of the trigger 34 is fixed an elongated stud 37 which is biased through an aperture 38 in the wall of bushing 2 to extend into the forward end of the recess 32 in the draw bar 11. Also fixed to the inner face of the trigger 34 forwardly of the stud 37 is a latch projection 39, the projecting face thereof being inclined inwardly and rearwardly relative the bushing 2. The shedder hub 23 is provided with a recess 40 to the rear thereof. The latch 39 is adapted to engage in the recess 40 in the shedder 23 to latch it in its working position in the chuck housing 1 against the bias of the shedder springs 31 as shown in Fig. 1 of the drawings.

Locating pins 41 of a conical nature project in circular fashion from the conical surface 10 in the forward face of the chuck housing to function with the shedder mechanism 22 as will be described.

There is thus provided a practical embodiment of the invention which is particularly applicable as a gear chuck and which is employed as follows. The clamping finger 18 is draw bar operated and, as shown in Fig. 1 of the drawings, a pusher P generally automatically controlled by the working tool is associated with the draw bar 11 for initiation of the operation thereof. As shown in Fig. 1, a gear G is locked to the chuck assembly, the draw bar being biased by spring 13 to its rearmost position to dispose the finger 18 so as to lock the gear G in its working position. In this condition the shedder unit 22 is biased in its rearmost position within the housing 1 with the trigger 34 having its latch 39 engaged in the recess 40 in the shedder hub to retain the shedder in its retracted position. The stud 37 on the trigger is then biased into the recess 32 in the draw bar.

To start a cycle of operation, the draw bar 11 is pushed forward by pusher P to initiate the ejection of the finished gear element G in the chuck. As the bar 11 is moved forward against the bias of the spring 13, the projection 21 on the clamp finger 18 will clear the forward end of the bushing 2. As this occurs, the inner surface of the hook extension 19 of the finger is so shaped that as it comes into contact with the side wall of the aperture 15 the finger will pivot on the pin 17 through substantially 90° until the hook 19 is disposed to clear the inner wall of the bushing 2 and projects outwardly of the extremity of the bushing on continued movement of the bar 11.

This clears the clamp finger 18 from its locking position in front of the gear G. As the draw bar is moved forward, the rear end of the recess 32 therein passes under stud 37 of the trigger 34 camming it upwardly against the bias of trigger spring 35. This causes the latch 39 to disengage from the recess 40 in the shedder hub 23. The stored energy in the shedder springs 31 then functions to project the shedder unit 22 forwardly in accelerated fashion to strip the finished gear G from the chuck and off the bushing 2 at the forward end thereof.

It is contemplated that an unworked gear will then be presented to the chuck by an automatic loader which is not shown since it forms no part of the present invention. At this time the finger 18 is axially aligned with the bar 11 so that the gear is pushed freely onto the bushing 2 to contact the shedder plate 25. The shedder prongs 27 time the gear with the chuck locating pins 41. Since the shedder unit is keyed to the bushing 2, it cannot get out of time and so the gears will be timed in identical fashion as they are delivered to the shedder. The automatic loader will push the gear back into the chuck and in the progress will cause the shedder springs 31 to compress until the gear is chucked by the locating pins 41 seating between the gear teeth. The pusher P is released at this point and the spring 13 causes the draw bar 11 to retract. At this point the projection 21 of the finger 18 engages the end of the bushing 2. This causes the finger 18 to pivot on pin 17 causing the hook portion 19 thereof to project up through the aperture 15 in the bushing 2 and the opposite projection 20 to swing into the slot 14 in the bushing engaging the outer face of the chucked gear and locking it to the chuck assembly thereby. The projection 21 on the finger engages the inner wall of the bushing forward of aperture 15 to prevent the pivoting of the finger from its clamping position until the draw bar is operated to clear it from the bushing 2 once more in the ejecting process.

As the draw bar is retracted, the recess 32 aligned with the stud 37 of the trigger once more receives it in biasing engagement therein and at the same time the latch 39 engages in the recess 40 in the shedder unit to latch it in its chucked position. The gear in this instance may be operated on by a grinder and when the desired size of the gear is effected, the grinder may be automatically retracted to initiate rejection of the finished gear through actuation of the pusher P.

The ejection, loading, timing and chucking of the work by the improved chuck as provided by the invention is accomplished surely and swiftly in one continuous reciprocal movement of the draw bar. There is no lost motion involved and the locating of the work is effected identically each time. This all takes place while the chuck continues to rotate.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A chuck adapted for use with an automatic work feeder comprising, a chuck housing, bearing means mounted to said housing and projecting therefrom to receive work as it is fed to said housing, timing means mounted to said housing to engage and time the work as it is directed to said chuck housing over said bearing means, and control means operatively connected to said housing and having lock means adjustably connected thereto and operatively connected with said bearing means, said lock means being responsive to actuation of said control means to clear said bearing means automatically for delivery of work thereto and being responsive to release of said control means to engage with said bearing means to lock the work in its predetermined timed position to the chuck housing.

2. A chuck adapted for use with an automatic feeder comprising, a chuck housing, bearing means mounted to said housing and projecting therefrom for receiving an element to be worked from the feeder, timing means mounted to said housing and biased therefrom to engage and time the element as it is applied over said bearing means, said timing means being seated to said housing by the application of the element against the bias thereon, and control means mounted to said housing and operatively connected with said bearing means to automatically latch the element in its timed position to said housing for working thereof, said control means being operable on finishing of said element to unlatch it for automatic ejection by said timing means clearing the housing for delivery of another element to be worked.

3. A chuck comprising, a chuck housing having an operating face at one end thereof provided with locator means thereon, a shedder means mounted to said housing and normally biased outwardly therefrom at the operating face thereof, means connected with said shedder means for timing work as it is applied to the operating face of the chuck housing against the bias on said shedder means, said locator means engaging the work to establish it in a precisely predetermined working position to said housing, means mounted in said housing and operative to latch said shedder means thereto in an energized condition as the work is seated to said housing, and control means mounted to said housing and automatically responsive to seating of the work to latch it in its predetermined working position and operative on finishing of the work to unlatch it for automatic release of the shedder latch means by said control means in the process and automatic shedding of the finished work from said housing by said shedder means.

4. A chuck for use with an automatic feed unit comprising, a chuck housing, a cylindrical bearing member mounted therein and projecting from one face thereof, said bearing member being adapted to have work applied thereto and delivered thereon to said one face of said housing, means on said one face of said housing to precisely position the work as it seats thereto, and a shaft mounted within said bearing member in slidable relation thereto and having lock means adjustably connected to the outer end thereof adjacent the outer end of said bearing member, said lock means being operatively related to aperture in the outer end of said bearing member whereby on movement of said shaft in one direction, said lock means will be projected through said apertures to engage and lock the work in its required position to said housing, and on movement of the shaft in the opposite direction, said lock means will be automatically aligned axially of the shaft within said bearing member to release the work thereby.

5. A bevel gear chuck having a conical recess in the operating face thereof, adapter means projecting from said housing centrally of the conical recess therein for receiving and guiding a gear into a precisely predetermined seated position to said housing in the recess therein, a draw bar axially extending through said housing and the recess therein for movement relative thereto and having a formed latch pivotally connected thereto, and cam means on said adapter operatively engaging said latch to pivot it automatically to engage and lock the gear to the housing in its fixed position on movement of the bar in one direction and to pivot it to an unlatching position on movement of the bar in the opposite direction.

6. A chuck comprising, a chuck housing having an operating face with locater means thereon, a bearing means mounted in fixed relation to said housing and extending axially thereof, an operating rod within said bearing means, biasing means between said bearing means and said rod to normally bias said rod inwardly of said housing relative the operating face thereof, ejector means mounted to said housing at the operating face and normally biased outwardly therefrom, and a lock means pivotally connected to said rod and operatively associated with said bearing whereby on projection of said rod against the bias of said biasing means, said lock means is disposed axially of said rod and an element to be worked is delivered longitudinally of said bearing means to the operating face of said housing, said ejector means engaging and timing the element in the process for precise positioning thereof to said housing by said locator means, and on release of said rod it will be biased to the housing, said bearing means engaging said lock means to pivot and engage the element in its precise position to the housing for working.

7. A chuck comprising, a centrally apertured chuck housing having a draw bar mounted therein axially thereof, chucking means in one face of said housing about the aperture therein, bearing means fixedly mounted to said housing in the aperture thereof and about said draw bar, extending from said one face of said housing and affording a bearing for said draw bar, means between said draw bar and said housing to normally bias said draw bar inwardly of said one face of the housing, said draw bar having lock means connected thereto to extend radially of said bearing adjacent its outer end to normally prevent delivery of an item to be worked thereto, shedder means seated to said one face of said housing in biased relation therefrom, said bar being operable against its biasing means to cause retraction of said lock means and clear said bearing means for delivery of an item to be worked thereto for guiding into chucking relation to said chucking means, said shedder means being biased to said one face of the housing in the process, whereby on release of said draw bar, said bar will bias to its normal position to effect projection of said lock means radially of said bearing means to clamp the item to be worked in its chucked position, a further operation of said draw bar against its biasing means clearing said bearing means for automatic ejection of the finished item from said chuck housing.

8. A chuck comprising, a centrally apertured housing having chucking means on one face thereof, a cylindrical bearing fixed to said housing in the aperture thereof and extending forwardly of said one face, said bearing having an aperture adjacent the outer projecting end thereof, shedder means having spaced timer elements projecting therefrom mounted to said housing to normally project outwardly of said one face thereof, an operating bar slidably mounted in said bearing and having lock means operatively related to said bearing at the apertured end thereof, whereby on said bar being projected forwardly of said bearing, said lock means will be retracted within said bearing for delivery of an item to be worked to said bearing to be timed by said shredder timing means as it is applied and precisely seated to said housing by said chucking means, and on retraction of said bar, said lock means will be projected through the aperture in the end of said bearing to engage and clamp the item delivered in its precise working position to the housing.

9. A gear chuck for use with a feeder unit comprising, a chuck housing, a bearing in said housing and fixed thereto, said housing being recessed about said bearing at one face constituting the operating face thereof, a draw bar slidably mounting in said bearing and projecting therefrom at the rear end thereof from the side of said housing opposite the operating face thereof, a coil spring about said draw bar at the rear end thereof engaging a cap fixed to said bar at its rear extremity and to said bearing to normally bias said draw bar to a position rearwardly of said housing, ejector means mounted to said housing in biased relation therefrom, trigger means in said housing normally projecting through a hole in said bearing in operative relation to said draw bar and having means to normally latch said ejector means to said housing in this condition, and means connected to the forward end of said draw bar, operatively related to said bearing, and adapted to axially align with said draw bar on forward movement thereof against its spring bias for delivery of a gear to the recess in said housing about the bearing therein, and adapted to project radially outward of said bearing on release of said bar to its normal position to precisely clamp the gear in a predetermined working position to said housing, and means on said draw bar operative to release said trigger means when the gear is finished and the bar is moved forward against its bias to clear said bearing whereupon said ejector means will automatically eject the finished gear at this point and be latched once more to its normal position when the next gear is applied.

10. A chuck comprising, a chuck housing having formed chucking means fixedly mounted to one face thereof, said chuck housing being centrally apertured, a cylindrical bearing member fixed in said housing within its aperture and having one end thereof projecting from said one face thereof, a draw bar slidably mounted in said bearing for axial movement relative thereto, the outer end of said cylindrical bearing having an aperture therein spaced inward of the extremity thereof and being slotted inwardly of said extremity at a position diametrically opposed to the aperture therein, the outer end of said bar being slotted, a lock plate pivotally mounted in said bar slot in a pin transversely thereof in said bar, said lock plate pivoting in the central plane of said aperture and bearing slot, said lock plate having a projecting hook portion operatively related to the apertured portion of said bearing member, a projection opposite the hook portion adapted to project through the slot in said bearing, and a limit projection to the forward side thereof arranged at right angles to said hook portion and defining a recess therebetween normally accommodating the forward extremity of the bearing defining the aperture therein whereby on movement of said bar in one direction, the extremity of the bearing adjacent said aperture will engage the limit projection of the lock plate to pivot the plate and cause the hook portion to project through the aperture in the bearing and the opposite projection to engage through the bearing slot for clamping an item to be worked in a precise position to said chucking means, and on movement of said bar in the opposite direction, the hook projection will be engaged by the bearing to pivot the plate within the bearing and release the item.

11. A gear chuck for use with an automatic feeder comprising, a chuck housing centrally apertured to mount a cylindrical bearing therein to extend from one face thereof, a cylindrical recess in said one face of said housing, about said bearing, a cylindrical hub seating in said recess and having a timing plate fixed to the outer face thereof, biasing means in said recess urging the timing plate outwardly of said one face thereby, a latch means in said housing mounted radially of said hub to normally latch it in said housing, a draw bar slidably mounted in said bearing and having a notch therein normally aligned with an aperture in said bearing, a stud on said latch means engaged in the bearing aperture and normally seating in the bar notch in its latching position, clamp means on the end of said bar adjacent the said face of the housing and operatively related to said bearing whereby on movement of the bar forwardly of the said face of the housing, said clamp means is moved to a position axially of the bar and said latch means is cammed to release said timing plate for projection forwardly of said one face of the housing to receive and time a gear as it is delivered to said housing over said bearing, the timing plate being seated to the housing in the process, and on movement of the bar in the opposite direction, the notch will align with said stud and said latch means will latch the timing plate hub once more and simultaneously said clamp means will engage and clamp the gear in its timed position to the housing for working thereof.

12. A gear chuck for use in automatic chucking in conjunction with an automatic feeder comprising, a chuck housing having means mounting axially thereof for selectively preventing and permitting delivery of a gear thereto, timing means mounted to said housing and normally biased forwardly thereof in the direction from which gears are fed thereto for working thereof, chuck pins mounted to said housing in predetermined spaced circular relation in fixed relation to said timing means, guide means on said housing for guiding a gear as it is fed to said timing means, which is seated to the housing by the gear as it is fed, when said axially mounted means is selectively adapted to provide for this, the chuck pins finally establishing the gear in a precise working position as it seats to the housing, said axially mounted means being automatically operable on seating of a gear to the housing to lock it thereto in its precise position and prevent delivery of another gear to said housing thereby, and on the gear being finished, said axially mounted means will release the gear for automatic ejection by said biased timing means and will be disposed to permit delivery of another gear for working thereof.

References Cited in the file of this patent

UNITED STATES PATENTS

| | | |
|---|---|---|
| 1,739,371 | Parker | Dec. 10, 1929 |
| 2,710,194 | Bailey | June 7, 1955 |